United States Patent
Drew et al.

(10) Patent No.: US 10,491,688 B2
(45) Date of Patent: Nov. 26, 2019

(54) VIRTUALIZED NETWORK FUNCTION PLACEMENTS

(71) Applicant: Hewlett Packard Enterprise Development LP, Houston, TX (US)

(72) Inventors: Julie Ward Drew, Redwood City, CA (US); Freddy Chua, Palo Alto, CA (US); Ying Zhang, Palo Alto, CA (US); Puneet Sharma, Palo Alto, CA (US); Bernardo Huberman, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 695 days.

(21) Appl. No.: 15/142,141

(22) Filed: Apr. 29, 2016

(65) Prior Publication Data
US 2017/0318097 A1  Nov. 2, 2017

(51) Int. Cl.
*H04L 29/08* (2006.01)
*H04L 12/24* (2006.01)
(Continued)

(52) U.S. Cl.
CPC .......... *H04L 67/16* (2013.01); *H04L 41/0806* (2013.01); *H04L 67/10* (2013.01);
(Continued)

(58) Field of Classification Search
CPC ..... H04L 67/10; H04L 67/16; H04L 67/2833; H04L 41/0806; H04L 41/145; H04L 45/64; H04L 47/783
(Continued)

(56) References Cited

U.S. PATENT DOCUMENTS

2015/0082308 A1   3/2015  Kiess et al.
2015/0113144 A1*  4/2015  Bauer ................... H04L 47/70
                                                    709/226
(Continued)

FOREIGN PATENT DOCUMENTS

WO   WO-2015118875   8/2015

OTHER PUBLICATIONS

Addis et al., Virtual Network Functions Placement and Routing Optimization, HAL archives, Jul. 1, 2015 https://hal.inria.fr/hal-01170042v1/document (Year: 2015).*
(Continued)

*Primary Examiner* — James E Springer
(74) *Attorney, Agent, or Firm* — Nolte Intellectual Property Law Group

(57) ABSTRACT

Example implementations relate to virtualized network function (VNF) placements. For example, VNF placements may include generating an initial mapping of a plurality of VNFs among a plurality of nodes of a network infrastructure, wherein the initial VNF mapping distributes each of a plurality of service chains associated with the plurality of VNFs to different top-of-rack switches. VNF placement may include generating an alternate VNF mapping of the plurality of VNFs among a portion of the plurality of nodes, wherein the alternate VNF mapping corresponds to a metric associated with node resource utilization and a particular amount of servers utilized by distributing the plurality of service chains according to the alternate VNF mapping. VNF placement may include placing the plurality of VNFs according to a selected placement from the initial VNF mapping and the alternate VNF mapping.

20 Claims, 8 Drawing Sheets

(51) Int. Cl.
*H04L 12/911* (2013.01)
*H04L 12/715* (2013.01)

(52) U.S. Cl.
CPC ........ *H04L 67/2833* (2013.01); *H04L 41/145* (2013.01); *H04L 45/64* (2013.01); *H04L 47/783* (2013.01)

(58) Field of Classification Search
USPC ........................................................ 709/201
See application file for complete search history.

(56) References Cited

U.S. PATENT DOCUMENTS

| | | | |
|---|---|---|---|
| 2015/0195178 A1† | 7/2015 | Bhattacharya et al. | |
| 2016/0105489 A1* | 4/2016 | Llorca | H04W 4/70 709/226 |
| 2016/0182345 A1* | 6/2016 | Herdrich | H04L 43/50 709/224 |
| 2016/0246652 A1* | 8/2016 | Herdrich | G06F 9/5077 |
| 2016/0294643 A1* | 10/2016 | Kim | H04L 67/16 |
| 2017/0078216 A1† | 3/2017 | Adolph et al. | |
| 2017/0288971 A1* | 10/2017 | Jayaraman | H04L 41/12 |
| 2017/0324828 A1† | 11/2017 | Clavera et al. | |
| 2018/0225139 A1* | 8/2018 | Hahn | G06F 9/45558 |

OTHER PUBLICATIONS

Bari, F. et al., "On Orchestrating Virtual Network Functions in NFV", (Research Paper), Mar. 25, 2015, 14 pages.
ETSI, "Network Functions Virtualisation (NFV);Use Cases", (Research Paper), Oct. 2013, 50 pages.
Krishnaswamy, D. et al., "Latency and Policy Aware Hierarchical Partitioning for NFV Systems", (Research Paper), Nov. 18-21, 2015, 7 pages.
Luizelli, et al., "Piecing Together the NFV Provisioning Puzzle: Efficient Placement and Chaining of Virtual Network Functions", IFIP/IEEE, Dec. 2015, 9 pages.
Mehraghdam, Sevil, et al., "Specifying and Placing Chains of Virtual Network Functions", Research Paper, Jun. 4, 2014, 7 pages.
Moens, et al., "VNF-P: A Model for Efficient Placement of Virtualized Network Functions", Ghent University-iMinds, Dept. of Information Technology, Dec. 2014, 6 pages.
Wang, F. et al., "Bandwidth Guaranteed Virtual Network Function Placement and Scaling in Datacenter Networks", (Research Paper), Dec. 14-16, 2015, 8 pages.

\* cited by examiner
† cited by third party

VIRTUALIZED NETWORK FUNCTION PLACEMENTS

BACKGROUND

A virtualized network function (VNF) may include a network function (e.g., caching, Virtual Private Network (VPN) functions, packet inspection, firewall services, intrusion detections, proxy functions, etc.) deployed as a virtualized instance on a commodity server. Utilizing a VNF may enable network providers such as telecommunications infrastructure providers to replace specialized network equipment hardware to provide the function, with commodity servers capable of running the VNF. A VNF placement system may be utilized to assign VNF as a virtualized instance to nodes (e.g., commodity servers, core switches, aggregation switches, top of rack switches, etc.) in a physical infrastructure (e.g., datacenter) of the network.

DETAILED DESCRIPTION

Figure 1:
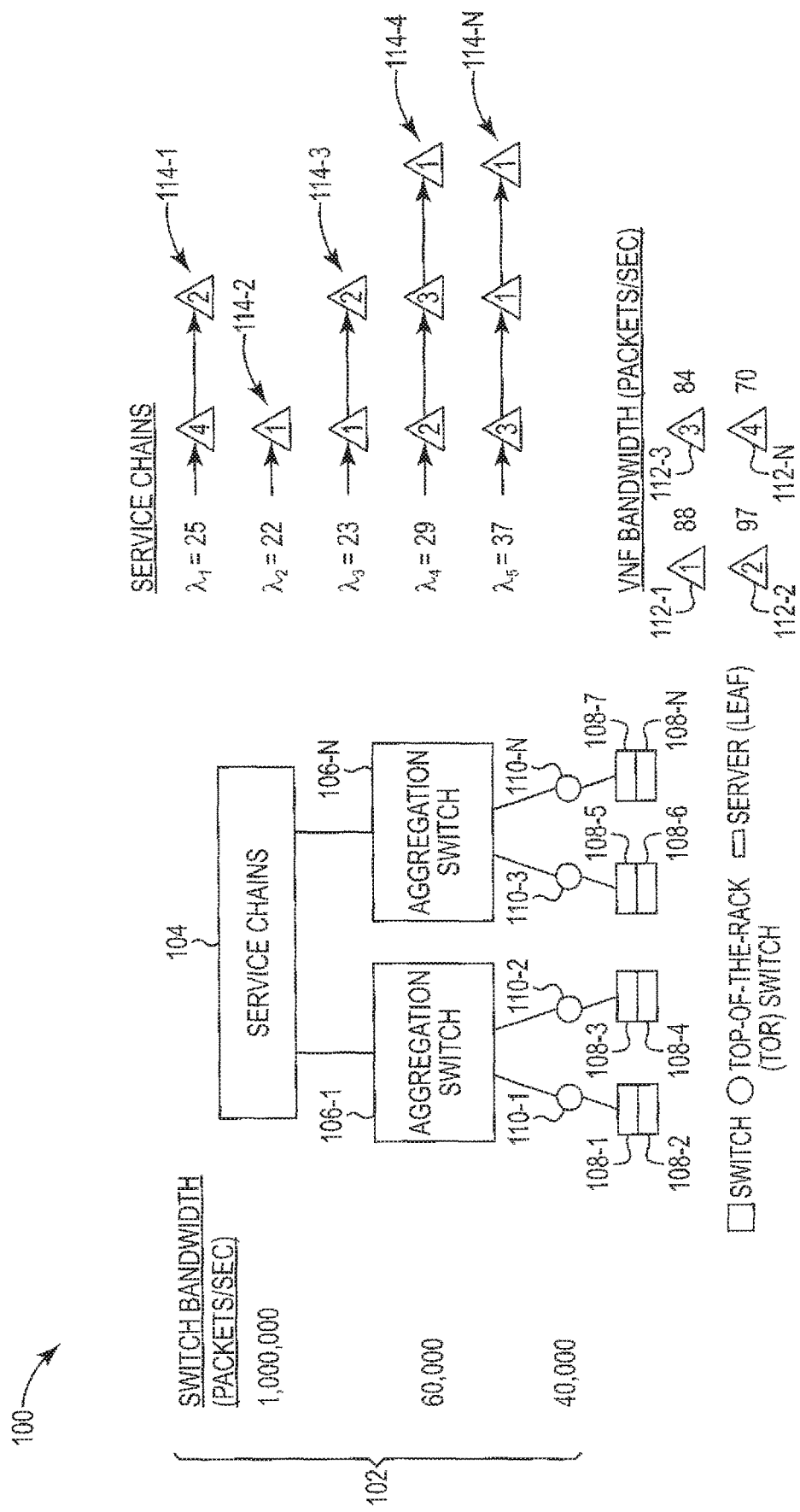
FIG. 1 illustrates an example of a VNF placement scenario according to the disclosure.

Telecommunications providers may be increasingly adopting the utilization of Network Functions Virtualization (NFV) within their network infrastructure. Utilizing Virtualized Network Functions (VNFs) may allow maintenance of carrier-grade service levels while reducing a telecommunications provider's capital expenditure and operational expenditure associated with operating such a telecommunications network. NFVs may contribute to cost savings by enabling a telecommunications network provider to replace special purpose networking equipment with commodity servers running VNFs. NFVs may also include the non-static assignment of VNFs to various nodes (e.g., commodity servers, core switches, aggregation switches, top of rack switches, etc.) within the telecommunications network infrastructure to meet varying workloads. Utilizing the VNFs may accommodate non-static fine-grained Service Function Chaining (SFC) where various service function chains (e.g., customer demands and an associated series of function to be performed in a specific order for a particular set of flows) may be strung together and deployed using software-defined networking (SDN) enabled dynamic route control.

The placement VNFs within a telecommunications network infrastructure may be automated. Approaches to automate placement of VNFs may have functioned to map VNFs to a particular (e.g., smallest) number of servers. These approaches may have modeled latency in the telecommunications network based on an assumption that packets associated with a service chain have a fixed delay, independent of overall traffic in the network, when passing through VNFs, nodes and edges, and/or may impose constraints on the overall latency of each service chain.

In contrast, a VNF placement systems described herein may route traffic through the service chains and map VNFs in a network at an operating point representing a particular selected trade-off between network resource usage and end-to-end SFC latency. For example, a VNF placement system may generate an initial mapping of a plurality of VNFs among a plurality of nodes of a network infrastructure. The initial VNF mapping may distribute the service chain traffic evenly across a network infrastructure by distributing a service chain associated with the VNFs to a top-of-rack switch that is different than a previous top-of-rack switch to which a previous service chain was distributed. A VNF placement system may generate an alternate VNF mapping of the plurality of VNFs among a portion of the plurality of nodes. The alternate VNF mapping may correspond to a metric associated with node resource utilization and a particular amount of servers utilized. A VNF placement system may place the VNFs according to a selected placement from the initial VNF mapping and the alternate VNF mapping.

As used herein, a service chain may include a sequence of actions such as requests for execution of a task. The sequence of actions may be a sequence of actions specified in a request, for example, from a network user or administrator. The actions may be specified in a stream of data packets traversing the network infrastructure. The stream of data packets may include units of data utilized in Internet Protocols (IP) transmissions for data navigating a network. The actions associated with the stream of data packets may correspond to or be accomplished through corresponding network functions. The service chains may specify an order in which the actions will be performed. Further, the service chains may specify the order in which a corresponding series of functions will be utilized to execute the specified order of actions. As such, the service chain may specify a sequence and/or order of VNFs to be visited by the network traffic for the given service chain and/or a plurality of service chains.

As used herein, a function may include a network function. A function may include a functionality to provide a network service, a micro-network service, and/or a plurality of micro-network services composed together to provide a macro-network service. A function may include a function that may be performed by specialized and/or proprietary hardware. However, in the context of VNFs the term function may include a network function that has been virtualized and may be implemented as software and/or a virtual machine implemented by utilizing at least a portion of a network node. For example, the function may include a virtual machine running software and processes on top of standard high-volume commodity servers, switched and storage, or even a cloud computing infrastructure. Examples of particular functions may include network address translation (NAT), firewalling, intrusion detection, domain name service (DNS), caching, Virtual Private Network (VPN) type functions, packet inspection, proxy functions, etc.

As used herein, a node may include a network node. For example, a node may include data communication equipment such as a modem, hub, bridge or switch; or data terminal equipment such as a host computer, a router, a workstation or a server. In an example, a node may include a commodity server within a telecommunications network infrastructure.

The VNF placement system may provide a VNF placement solution to a VNF placement scenario. As used herein, a VNF placement scenario may include choosing where to place (e.g., instantiate) instances of VNFs on nodes in a physical network to accommodate the traffic for a set of service chains. A VNF placement scenario may include a combinatorial scenario involving a large number of discrete placement decisions. As used herein, a VNF placement solution may include a proposed or actual mapping of instances of VNFs in the physical network in a manner that accommodates a portion of the service chains. The VNF mapping may include an initial VNF mapping, which may include a proposed or actual VNF placement mapping produced utilizing a heuristic. The VNF mapping may include an alternate VNF mapping solution, which may include a proposed or actual VNF mapping produced utilizing a mixed integer programming (MIP) approach. The VNF mapping may include a mix of the initial and/or alternate VNF mappings in addition to data associated with those mappings such as an expected latency of service chain packets associated with the mapping. VNF solutions may be displayed or otherwise presented as part of an interface which may be utilized to select a VNF mapping. A VNF mapping may include a VNF mapping selected by, for example, a network provider from the initial VNF mapping and/or the alternate VNF mapping.

A VNF mapping may include the placement (e.g., instantiation) of instances of each of a number of VNFs on servers of the network infrastructure. The VNF mapping may include designating a route for the network traffic of each service chain. The VNF mapping may include a mapping accommodating the network traffic from a set of service chains. The VNF mapping may include a mapping accommodating a subset of the set of service chains where the entire set of service chains is not accommodated. The subset of the service chains may be service chains assigned a highest priority among service chains. A VNF placement mapping may include a mapping splitting the network traffic for a given service chain among multiple data paths in the network when multiple instances of a specific VNF are used.

A VNF mapping may take into account that a network may include heterogeneous server types, such that a particular server type may be more efficient (e.g., faster, utilize fewer computational resources, include hardware or software particularly adapted to execute a VNF, etc.) at running a given VNF than others. The server heterogeneity may be taken into account when choosing where to place the VNFs within the network topology.

The VNF mappings described herein may model the impact of network traffic latency and produce a variety of solutions along an efficient frontier of network performance and network resource utilization. The VNF mapping may balance competing objectives of reducing congestion-induced latency and reducing the amount of servers utilized.

FIG. 1 illustrates an example of a VNF placement scenario 100. The VNF placement scenario 100 includes a physical network topology 102. The physical network topology 102 may include a graph of the physical infrastructure of a network including a core switch 104 root node, a plurality of aggregation switches 106-1 . . . 106-N, a plurality of servers 108-1 . . . 108-N, and a plurality of top-of-rack (TOR) switches 110-1 . . . 110-N. A TOR switch 110-1 . . . 110-N may include a physical switch placed within a rack of servers. Although termed a "top"-of-rack switch, the physical location of the switch is not necessarily at the top of the rack, but could be anywhere in the rack including the middle and/or bottom position. The TOR switch may be linked to a plurality of servers in the rack via patch cables and the TOR may link the rack to the network infrastructure. For example, the servers of a rack may be patched to a TOR and the TOR may be connected to an aggregation switch connecting out to the network infrastructure. In some examples, the core switch 104 bandwidth may be 1,000,000 packets per second, the aggregation switch 106-1 . . . 106-N bandwidth may be 60,000 packets per second, and the TOR switch 110-1 . . . 110-N bandwidth may be 40,000 packets per second.

The example VNF placement scenario 100 may include four distinct VNFs 112-1 . . . 112-N to be placed upon the servers 108-1 . . . 108-N. The VNFs 112-1-112-N may consume, for example, eighty-eight, ninety-seven, eighty-four, and seventy packets per second bandwidth, respectively. A bandwidth consumption of a VNF 112-1 . . . 112-N may depend on the type of server hosting it, but in this example there is a single server type.

The example VNF placement scenario 100 may include five service chains 114-1 . . . 114-N to be routed through the network topology 102. The service chains 114-1 . . . 114-N may each include a unique sequence of VNFs 112-1 . . . 112-N and each with a different traffic rate in packets per second. For example, service chains 114-1 . . . 114-N may include a twenty-five, twenty-two, twenty-three, twenty-nine, and thirty-seven packets per second traffic rate, respectively.

VNF placement solutions may be generated for the example VNF placement scenario 100 utilizing the VNF placement mechanism described herein. The example VNF placement scenario 100 is provided as an example scenario to assist in visualizing a possible VNF placement scenario, but should not be interpreted to limit the examples described herein. The example VNF placement scenario 100 is provided to serve as a visualization of a potential VNF placement scenario and how its elements may be arranged. Example VNF mapping solutions corresponding to the VNF placement scenario 100 are described in greater detail with regard to FIG. 6.

Figure 2:
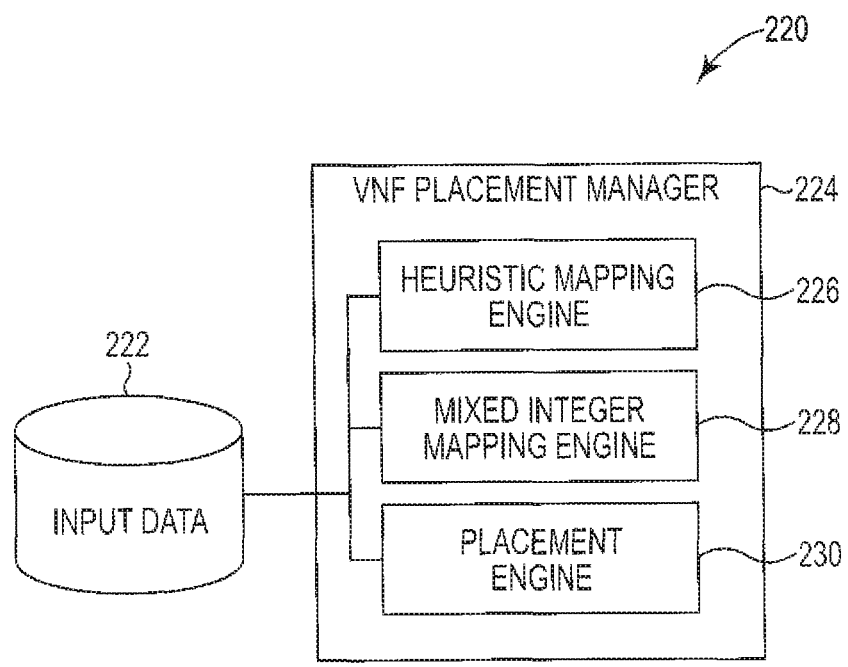
FIG. 2 illustrates a diagram of an example of a VNF placement system according to the disclosure.

FIG. 2 illustrates a diagram of an example of a VNF placement system 220. The system 220 may be utilized to generate a VNF placement solution to a VNF placement scenario (e.g., VNF placement scenario 100 of FIG. 1). The system 220 may include input data 222, a VNF placement manager 224, and/or an engine and/or a plurality of engines (e.g., a heuristic mapping engine 226, a mixed integer mapping engine 228, and a placement engine 230, etc.). The VNF placement manager 224 may include additional or fewer engines than those illustrated to perform the various functions as will be described in further detail.

An engine or a plurality of engines (e.g., a heuristic mapping engine 226, a mixed integer mapping engine 228, and a placement engine 230, etc.) may include a combination of hardware and programming (e.g., instructions executable by the hardware), but at least hardware, that is to perform the functions described herein (e.g., generate an initial mapping of a plurality of VNFs among a plurality of node of a network infrastructure, wherein the initial VNF mapping distributes each of a plurality of service chains associated with the plurality of VNFs to different top-of-rack switches; generate an alternate VNF mapping of the plurality of VNFs among a portion of the plurality of nodes, wherein the alternate VNF mapping corresponds to a metric associated with node resource utilization and a particular amount of servers utilized by distributing the plurality of service chains according to the alternate VNF mapping; place the plurality of VNFs according to a selected placement from the initial VNF mapping and the alternate VNF mapping; etc.). The programming may include program instructions (e.g., software, firmware, microcode, etc.) stored in a memory resource (e.g., computer readable medium, etc.) as well as hard-wired program (e.g., logic).

The input data 222 may include a physical network topology, the VNFs, and the service chains to be placed. The physical network topology may include a bi-directional graph with a property that each ordered pair of nodes has a unique acyclic directed path from a first node to a second node. The underlying structure may be that of a tree, formed of a set of switched (including a single root switch r), and a set of servers which are leaf nodes in the tree. As used herein, leaf nodes are nodes that are connected to only one other node in the network. N may denote the set of all nodes in the tree and $L \subset N$ may be the set of servers. In an example network, for every edge going from a node i to node j in the network, there is a corresponding opposite edge going from j to i. $P_{n,m}$ may be the set of nodes in the unique acyclic path from node n to m, including the destination m but excluding the origin n. $\mu_n$ may be the processing rate, in packets per second, associated with any switch $n \in N\backslash L$. Just as switches may have different processing rates, servers may also differ in their functionality. S may represent the set of different possible server types that servers can be. $S_l$ may be the machine type associated with server $l \in N$.

V may denote a set of VNF types. Instances of various VNF types may be assigned to servers in the physical network in order to accommodate service chains. Multiple instances of a given VNF type v may be assigned to network servers. It may be assumed that a server in the network can accommodate at most one VNF instance, although such a constraint may be relaxed. Performance of a given VNF may depend on the machine type of the server to which it is assigned. For example, $\gamma_v^s$ may be the processing rate, in packets per second, of VNF type $v \in V$ when assigned to machine type $s \in S$.

C may denote the set of service chains to be mapped to the network nodes. Service chain $c \in C$ may include a possibly repeating sequence of VNF types. $q_c$ may represent the number of VNF types in a service chain c. $\alpha_{i,v}^c$ may be a binary parameter indicating whether the $i^{th}$ function in service chain c is of type v. The arrival process for service chain c may be a Poisson process with arrival rate of $\lambda_c$ packets per second. Traffic for service chain c may enter the physical network through the root node, visit each function according to the chain's function sequence, and then depart the network from the root node. $\Lambda = \Sigma_c \gamma_c$ may be the sum of arrival rates of all the service chains in the network.

The heuristic mapping engine 226 may include hardware and/or a combination of hardware and programming, but at least hardware to generate an initial VNF mapping of a plurality of VNFs among a plurality of nodes of a network infrastructure. The heuristic mapping engine 226 may import the input data 222. The heuristic mapping engine 226 may import information regarding the physical topology of the network infrastructure, the VNFs, and/or the service chains. The heuristic mapping engine 226 may produce an initial VNF mapping. Although the mapping is referred to herein as an initial VNF mapping, it may not be a first mapping in an order. Although, in some examples the initial VNF mapping generated by the heuristic mapping engine 226 may be passed on, along with the input data 222, to the mixed integer mapping engine 228 to utilize as a starting point for a first run of the mixed integer mapping engine 228. The initial VNF mapping may include a mapping of the routing of service chain traffic data flows through the physical infrastructure of the network. The initial VNF mapping may also include a mapping of the placement of corresponding VNFs, determined from the service chains, to the physical infrastructure of the network.

The heuristic mapping engine 226 may include hardware and/or a combination of hardware and programming, but at least hardware to generate the initial VNF mapping based on a heuristic. The heuristic may determine a feasible and/or functional route for an incoming service chain while secondarily influencing overall latency of the service chain traffic. The initial VNF mapping may be based on a heuristic such as the heuristic illustrated in FIG. 3.

Figure 3:
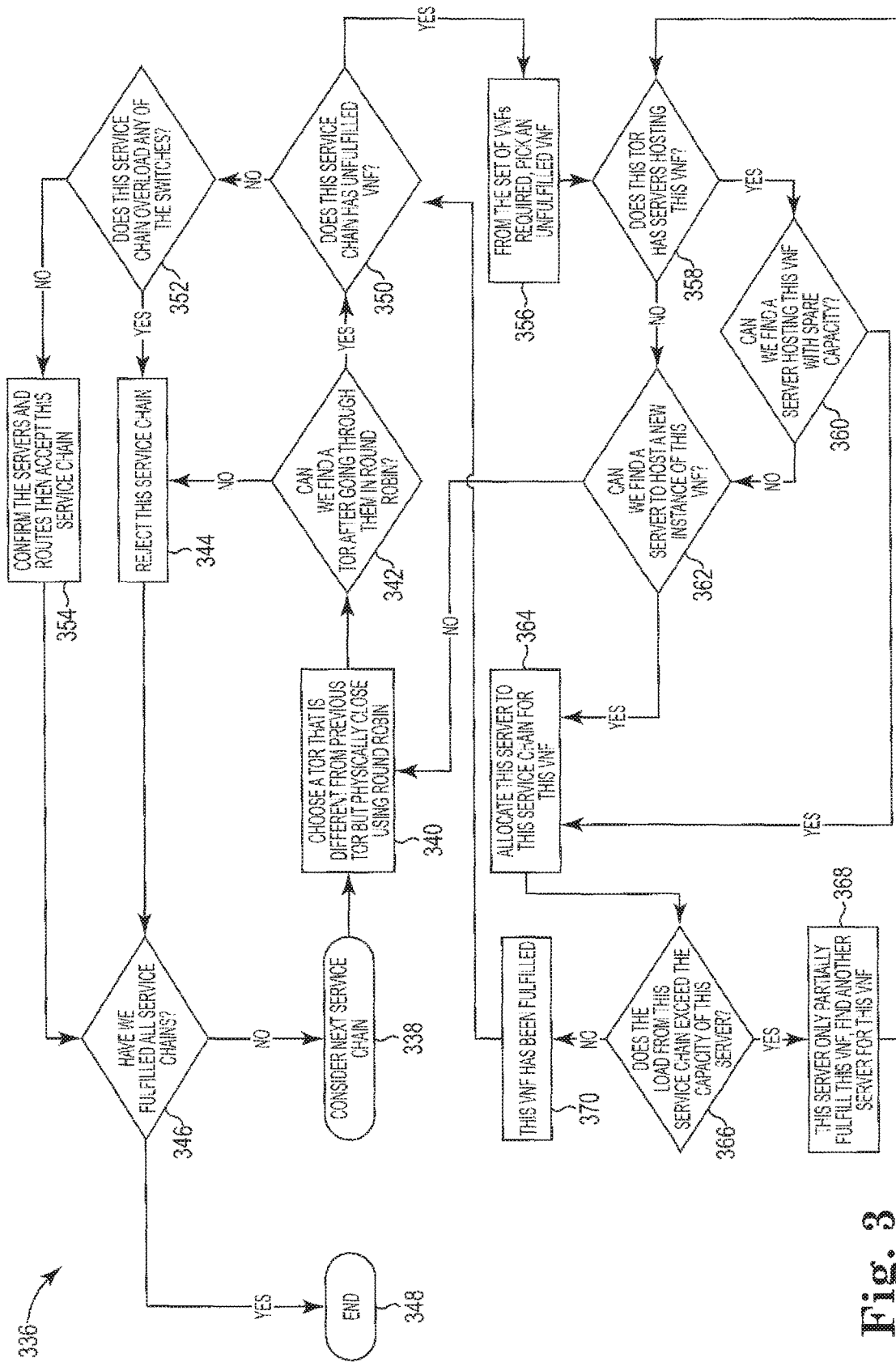
FIG. 3 illustrates a flowchart of an example of a heuristic utilized in determining an initial VNF mapping according to the disclosure.

FIG. 3 illustrates a flowchart 336 of an example of a heuristic that may be utilized in determining an initial VNF mapping. The heuristic may function to distribute the service chain network traffic among as many different TOR switches as possible. That is, the heuristic may function by distributing the service chain traffic among the greatest amount of TOR switches. By doing so, the heuristic may reduce a metric associated with node resource utilization over all the nodes. As used herein, a metric associated with node resource utilization may include a highest amount of node resource utilization across all the nodes, or more generally the network elements, of the network infrastructure. A highest amount of node utilization may include an amount of node utilization that is at least as large as an amount of node utilization of any other node in the network infrastructure. An amount of node utilization may refer to a portion of a capacity of a particular node's computational resources consumed by a portion of a service chain and/or a set of service chains routed through the node. The capacity may include a capacity defined by at least one threshold associated with an amount of resource consumption above and/or below which expected latency and/or packet dropping of packets associated with the service chain and/or service chains exceeds predefined limits. The amount of node resource utilization may be expressed as a percentage or other consumption metric of a nodes capacity that is being consumed by processing or otherwise handling a portion of a service chain or set of service chains. The amount of node resource utilization may include a largest quantity of node resource utilization. The threshold discussed above may include an amount of node resource utilization that is at or near a total possible capacity for a node, which once exceeded results in an inability of the node and/or a VNF instantiated at the node to handle further service chain traffic or decreases the performance of the node as measured by a rate of processing and/or a latency associated with service chain traffic at the node to a point below a limit.

Reducing the metric associated with node resource utilization may include reducing the highest amount of node resource utilization across the nodes of the network infrastructure. Reducing the highest amount of node resource utilization across a plurality of nodes may include reducing the node resource utilization at a particular node or at each node of a set of nodes included in a VNF mapping to a lowest amount while still accommodating a portion of service chain traffic. Such a reduction may include distributing service chain traffic so that a portion of all the nodes being utilized in the network infrastructure are not assigned an amount of service chain traffic that exceeds a threshold amount of data associated with maximum node utilization. In some examples, this may include distributing service chain traffic so that a lowest amount of node utilization is achieved at each node while still accommodating service chain traffic. In some examples, this may include distributing service chain traffic so that a largest margin between actual node resource utilization and full capacity node resource utilization at the nodes being utilized is preserved.

The heuristic may generate a substantially even distribution of service chain traffic across a plurality of nodes of a network infrastructure. The substantially even distribution may be accomplished by routing service chain traffic through different TOR switches and instantiating the VNFs accordingly. For example, the heuristic may generate a substantially even distribution of service chain traffic by routing an incoming service chain through a TOR switch that is different from a TOR switch utilized for a previous service chain. For example, when the heuristic identifies a route for a first portion of service chain traffic that utilizes a first TOR switch, the heuristic may enforce a constraint whereby a second portion of service chain traffic is routed through a second TOR switch that is different from the first TOR switch. By utilizing a different TOR switch each time a new service chain is routed, a plurality of service chains is distributed substantially evenly across the servers of a network infrastructure since each distinct TOR switch is patched to distinct servers making up a distinct portion of the network infrastructure.

In the event that a single node such as a server of the network infrastructure is insufficient to fulfill a placement of a VNF associated with a service chain, multiple nodes may be designated to host the same type of VNF. A single node may be insufficient to fulfill a placement of a VNF if, for example, the service chain traffic associated with the VNF may exceed a computational resource consumption and/or rate of processing capacity at the node. Instantiating instances of a VNF at multiple nodes may allow for a greater and/or more even distribution of service chain data traffic through the network infrastructure.

The flow chart 336 may continue to loop in enforcing the heuristic until the total amount of service chains to be hosted is depleted. Although not depicted as a specific block in FIG. 3, the heuristic may include ordering a set of TORs in the network infrastructure in a sequence such that the neighbors of a TOR in the sequence are also neighbors in physical proximity of the physical topology of the network infrastructure.

The flow for the flow chart 336 may start at block 338 "consider a service chain." For a set of incoming service chains C, a first-come-first-served policy to choose a service chain c∈C to consider for placement may be utilized.

The block 340 may include choosing a TOR for routing a service chain c. Choosing a TOR may include choosing a TOR that is different from a previously chosen TOR (e.g., chosen for routing of a previous service chain). Choosing a TOR that is different from a previously chosen TOR may include choosing a TOR that is different that the previously chosen TOR, but is physically close utilizing a round robin analysis of the TORs.

The block 342 may include the inquiry as to whether a TOR was found that was different from the previously chosen TOR after going through the TORs utilizing a round robin analysis. If the answer to the inquiry is "no" then the flow may proceed to block 344 where the service chain is rejected. If the service chain is rejected at block 344 then the flow may proceed to block 346. Block 346 may include the inquiry as to ether all the service chains have been fulfilled. All the service chains may be fulfilled when all incoming service chains have either been placed or rejected. If at block 346 it is determined that all the service chains are fulfilled the flow may terminate at block 348. If, however at block 346 it is determined that all the service chains have not been fulfilled, then the flow may proceed back to block 338 where a next service chain is considered.

Returning to the inquiry of block 342 as to whether a TOR was found that was different from the previously chosen TOR after going through the TORs utilizing a round robin analysis, if the answer to the inquiry is "yes," then the flow may proceed to block 350. Block 350 may include an inquiry as to whether the service chain has an unfulfilled VNF. An unfulfilled VNF may include a VNF associated with performance of an action specified in a service chain data flow that has not been placed on a node such as a commodity server, yet. If the service chain is determined to not have an unfulfilled VNF, then a proposed placement of the service chain may be considered substantially complete and the flow may proceed to block 352 where it is determined whether the service chain overloads any of the switches through which it is routed. If it does overload a switch, the flow proceeds to block 344 and the service chain is rejected. If the service chain does not overload a switch the flow proceeds to block 354 which may include confirming the servers and the routes and accept the service chain before the flow proceeds back to block 346.

If at block 350 it is determined that the service chain has an unfulfilled VNF, then the flow may proceed to block 356. At block 356 an unfulfilled VNF v∈Vc may be chosen from a sequence of VNFs specified in service chain c for placement in the network infrastructure. After a VNF v is chosen at block 356, the flow may proceed to block 358. At block 358, the TOR chosen at blocks 340 and 342 may be evaluated to determine whether the TOR already has a server m hosting the VNF v. If there are servers already hosting the VNF v then the flow may proceed to block 360 to determine if the servers hosting the VNF v have spare capacity to process the data flow of service chain c. Alternatively, if the TOR does not already have a server m hosting the VNF v, then the flow may proceed to block 362 to determine if a server may be identified to host a new instance of the VNF v.

If at block 360 it is determined that the server m hosting VNF v does have spare capacity sufficient to accommodate the data flow of service chain c, then the flow may proceed to block 364, which can include allocating the server m to the service chain c for the VNF v. Alternatively, if it is determined that the server m hosting VNF v does not have spare capacity sufficient to accommodate the data flow of service chain c, then the flow may proceed to block 362 to determine if a server may be identified to host a new instance of the VNF v.

As described above, the block 362 may include an inquiry as to whether a server may be identified that can host a new instance of a VNF v. If it is determined that a server cannot be identified to host a new instance of VNF v, then the flow may proceed back to block 340 where a TOR is chosen that is different from the previous TOR, but physically close. In such an example, the previous TOR may include the TOR that was the subject of the analysis resulting in the determination at block 362 that a server could not be identified to host a new instance of the VNF v. Alternatively, if it is determined that a server can be identified to host a new instance of VNF v, then the flow may proceed to node 364, which can include allocating the identified server to the service chain c for the VNF v.

Upon allocating a server to the service chain c for the VNF v the flow may proceed to block 366. Node 366 may include an inquiry as to whether the load of a service chain data flow from the service chain c may exceed the capacity of the allocated server from block 364. If it is determined at block 366 that the load will exceed the capacity of the allocated server, then the flow may proceed to block 368. Block 368 it may be determined that the allocated server may partially fulfill the VNF v and it may be determined that another server must be identified to accommodate a portion of the VNF v. Upon the determination at block 368 that another server must be identified, the flow may proceed back to block 358 to determine if the TOR has any other servers hosting the VNF v.

Alternatively, if at block 366 it is determined that the load of a service chain data flow from the service chain c does not exceed the capacity of the allocated server from block 364, then the flow may proceed to block 370. At block 370 the VNF v may be determined to have been fulfilled. From block 370 the flow may proceed back to block 350 to determine whether the service chain c has another unfulfilled VNFs.

Returning to the description of FIG. 2, the heuristic placement engine 226 may include hardware and/or a combination of hardware and programming, but at least hardware to generate the initial VNF mapping utilizing the heuristic described in the flowchart 336 of FIG. 3. Identifying an initial VNF mapping may include identifying a route for each of a plurality of service chains over a portion of a plurality of nodes in the network infrastructure according to a corresponding service chain specification. A service chain specification may include the VNFs that correspond to the actions requested in the service chain. As such, the route may satisfy a service chain specification by proceeding over a plurality of nodes including the VNFs to perform the requested actions. Additionally, the service chain specification may include a minimum metric associated with communicating the packets of the service chain across the network infrastructure and/or a minimum metric associated with a time allotted for performing the service chain. The heuristic placement engine 226 may include hardware and/or a combination of hardware and programming, but at least hardware to utilize a heuristic to generate the initial VNF mapping such that service chain traffic is distributed substantially evenly across the plurality of nodes of the network infrastructure. As described above, the heuristic may achieve this substantially even distribution of the service chain data flow traffic across the nodes of the network infrastructure by choosing a TOR switch for an incoming service chain that is different than a TOR chain chosen in mapping a route of a previous service chain. For example, the initial VNF mapping may distribute each of a plurality of service chains associated with the plurality of VNFs to different top-of-rack switches.

The heuristic placement engine 226 may include hardware and/or a combination of hardware and programming, but at least hardware to spawn a new instance of a particular VNF of a plurality of VNFs associated with a service chain. The new instance of the VNF may be spawned on spare capacity of a particular node of the plurality of nodes in a network infrastructure, if that node does not already host the particular VNF.

Additionally, the heuristic placement engine 226 may include hardware and/or a combination of hardware and programming, but at least hardware to spawn a plurality of instances of a same particular VNF and/or VNF type across the plurality of nodes of the network infrastructure when a particular node hosting the particular VNF or VNF type lacks the capacity to host all of a corresponding portion of service traffic. For example, a VNF may be determined from an incoming service chain and that VNF may be allocated for placement on a particular server. The service chain traffic load from the service chain may exceed the capacity of the particular server or the capacity of the particular server allocated to host the VNF. That is, the portion of the service chain traffic to be processed by the VNF may include an amount of traffic that would overwhelm the capacity of the particular server hosting the VNF for processing service chain data. In such an example, the heuristic placement engine 226 may include hardware and/or a combination of hardware and programming, but at least hardware to spawn another instance of the VNF on another server so that the service chain traffic may be distributed among the servers.

A mixed integer placement engine 228 may include hardware and/or a combination of hardware and programming, but at least hardware to generate an alternate VNF mapping of the plurality of VNFs among a portion of the plurality of nodes of the network infrastructure. The alternate VNF mapping may correspond to a particular value of a metric associated with node resource utilization and a particular amount of servers utilized. The metric associated with node resource utilization may include a highest amount of node resource utilization across the nodes of the network infrastructure expressed as the percentage (or other consumption metric) of a nodes capacity consumed by processing or otherwise handling an associated portion of service chain traffic.

For example, the mixed integer placement engine 228 may include hardware and/or a combination of hardware and programming, but at least hardware to generate a set of mapping solutions to the VNF placement scenario. Each of the VNF mapping solutions may represent a different tradeoff between network performance and network resource usage. Each alternate VNF mapping solution may be generated based on a mixed integer programming model for the VNF placement scenario. As used herein, a mixed integer programming model may include decision variables (some of which can take on discrete values), linear constraints, and an objective function which is linear in the variables.

The mixed integer programming model may include model parameters. For example, N may include the set of all nodes, such as the switches and servers, in the network. $L \subset N$ may include the set of servers, which can be considered as leaves in a tree network. $r \in N$ may include the root node. $P_{n,m}$ may include the set of nodes in the unique acyclic path from a node n to m, including the destination m but excluding the origin n. $\mu_n$ may include the processing rate, in packets per second, associated with switch $n \in N \backslash L$. S may include the set of different server types. $s_l \in S$ may include the machine type associate with a server $l \in L$. V may include the set of VNF types. Instances of these VNF types may be assigned to servers in the physical network in order to accommodate service chains. $\gamma_v^s$ may include the processing rate, in packets per second, of VNF type $v \in V$ when assigned to server type $s \in S$. C may include the set of service chains to be mapped to the network infrastructure. $q_c$ may include the number of VNF types in the service chain c. $\propto_{i,v}^c$ may include a binary parameter indicating whether the ith service in chain c is of type v. $\lambda_c$ may include the arrival rate, in packets per second, for chain c. M may be a large positive scalar. For example, any M such that $M > \max\{1, \max_{s,v}\{\gamma\}\}$ may be suitable. $\beta \in [0, 1]$ may include a parameter representing the relative weight between two metrics in the objective function.

The mixed integer programming model may include decision variables. The decision variables may describe the assigned placement of VNF instances to leaf nodes, the mapping of each service chain to a path in the network infrastructure, the volume of flow for each service chain along each of its paths, the rate of traffic into each node, and performance metrics associated with the VNF mapping solution. $X_{v,l} \in \{0, 1\}$ may indicate whether an instance of a VNF type v is placed on leaf l. $y_{i,l}^c \in [0, 1]$ may include the fraction of traffic for the ith function in service chain c that is served by leaf node l. $Z_{i,k,l}^c \in [0, 1]$ may include the fraction of traffic going from the ith to (i+1)st function in service chain c that travels from leaf node k to leaf node l. $b_k \geq 0$ may be the total traffic rate in packets per second into physical node k. $\rho$ may include a highest node resource utilization over all the nodes in the network. w may include the objective value.

The mixed integer programming model may include constraints. The constraints may ensure that each service chain is properly deployed, that the solution does not utilize more than the available network resources, and that the metrics are accurately captured. Each server $l \in L$ may have at most one VNF type assigned to it.

$$\sum_{v \in V} x_{v,l} \leq 1. \quad \text{(Eq. 1)}$$

The ith function in service chain c may be placed at a server hosting the VNF type associated with the ith function, for $i \leq q_c$:

$$y_{i,1}^c \leq \sum_v \alpha_{i,v}^c \cdot x_{v,1}. \quad \text{(Eq. 2)}$$

The total traffic for the ith function in service chain c may be placed for $i \leq q_c$.

$$\sum_{l \in L} y_{i,l}^c = 1. \quad \text{(Eq. 3)}$$

Constraints of Eq. 4 and Eq. 5 may ensure that $Z_{i,k,l}^c$ does not exceed $y_{i,k}^c$ or $y_{i+1,l}^c$ for each chain c, for each function index $i < q_c$, and each physical server pair k, $l \in L$:

$$Z_{i,k,l}^c \leq y_{i,k}^c \quad \text{(Eq. 4).}$$

$$Z_{i,k,l}^c \leq y_{i+1,l}^c \quad \text{(Eq. 5).}$$

A total traffic rate associate with the ith function to the (i+1)st function in service chain c may be allocated, for $i < q_c$:

$$\sum_{k,l \in L} z_{i,k,l}^c = 1. \quad \text{(Eq. 6)}$$

For each chain c, the traffic entering a server $k \in L$ may equal the traffic exiting k $$y_{1,k}^c + \sum_{m \in L} \sum_{i < q_c} z_{i,m,k}^c = \sum_{m \in L} \sum_{i < q_c} z_{i,m,k}^c + y_{q_c,k}^c. \quad \text{(Eq. 7)}$$

The traffic rate $b_k$ may be defined into each physical non-root node $k \in N \setminus \{r\}$:

$$b_k = \sum_c \lambda_c \left( \sum_{l \in L: k \in P_{r,l}} y_{1,l}^c + \sum_{m \in L: k \in P_{m,r}} y_{q_c,m}^c + \sum_{l,m \in L: k \in P_{l,m}} \sum_{i < q_c} z_{i,l,m}^c \right) \quad \text{(Eq. 8)}$$

For each service chain c, Eq. 8 may capture the traffic into switch k coming from the root to any server l hosting the first function in the chain (term $\lambda_c \Sigma_{l \in L: k \in P_{r,l}} y_{1,l}^c$, the traffic into switch k heading toward the root from any server m hosting the last function in the chain (term $\lambda_c \Sigma_{m \in L: K \in P_{m,r}} y_{q_c,m}^c$), and the traffic between any pair of servers l and m hosting consecutive functions in the chain for which their path passes through switch k (the remaining term.)

The traffic rate $b_r$ may be defined into the root node r.

$$b_r = \sum_c \lambda_c \left( 1 + \sum_{m \in L} y_{q_c,m}^c + \sum_{l,m \in L: r \in P_{l,m}} \sum_{i < q_c} z_{i,l,m}^c \right) \quad \text{(Eq. 9)}$$

For each service chain c, Eq. 9 may capture the traffic into the root r coming from outside the network ($\lambda_c$), the traffic into r from any server m hosting the last function in the chain (term $\lambda_c \Sigma_{m \in L} y_{q_c,m}^c$), and the traffic between any pair of servers l and m hosting consecutive functions in the service chain for which their path passes through the root ($\lambda_c \Sigma_{(l,m): r \in P_{l,m}} \Sigma_{i < q_c} z_{i,l,m}^c$).

The traffic rate into switch $n \in N \setminus L$ may not exceed its processing rate:

$$b_n \leq \mu_n \quad \text{(Eq. 10).}$$

The traffic rate into server $l \in L$ may not exceed the processing rate associated with the VNF assigned to it:

$$b_l \leq \sum_{v \in V} \gamma_v^{s_l} \cdot x_{v,l}. \quad \text{(Eq. 11)}$$

The highest node resource utilization over all nodes may be at least as great as the resource utilization at any switch $n \in N \setminus L$:

$$\rho \geq \frac{b_n}{\mu_n}. \quad \text{(Eq. 12)}$$

The highest resource utilization over all nodes may be at least as great as the resource utilization at a server $l \in L$. Because the processing rate of a server depends on the VNF assigned to it, there may be a separate constraint for each VNF type v that could be assigned to server l:

$$\rho \geq \frac{b_l}{\gamma_v^{s_l}} - M(1 - x_{v,l}) \quad \text{(Eq. 13)}$$

If VNF type v is assigned to server l, then $M(1-x_{v,l})=0$ and the constraint may define that $\rho \geq b_l/\gamma_v^{s_l}$, where $\gamma_v^{s_l}$ is the processing rate of VNF v if assigned to the server l. If v is not assigned to server l, then the right hand side of Eq. 13 is negative, and so imposes no restriction on $\rho$.

There may not be constraints that impose an upper bound on the highest resource utilization $\rho$. An upper bound may not be defined, because the objective function drives the value of ρ down to the smallest value satisfying the constraints of Eq. 12 and Eq. 13, thus ensuring that it equals the true highest resource utilization over all nodes in the network infrastructure.

The mixed integer programming model may include model objectives. The model objective may include reducing the highest node resource utilization over the plurality of nodes in the network. The model objective may include reducing the amount of nodes utilized over the plurality of nodes in the network. The model objective may include reducing a weighted combination of the amount of nodes utilized and the metric associated with node resource utilization (e.g., the highest node resource utilization over all the nodes in the network). For example, the model objective may include:

$$\omega = \beta \frac{1}{|L|} \sum_{v \in V} \sum_{l \in L} x_{v,l} + (1 - \beta)\rho. \qquad \text{(Eq. 14)}$$

When β=0, the model objective may become reducing the highest resource utilization over all the nodes in the network. Such an objective may distribute network traffic as uniformly as possible in order to reduce the highest resource utilization over all the nodes. If instead β=1, the objective may become reducing the total number of nodes used to host VNFs. A placement of VNFs which minimizes the number of VNFs may tend to concentrate traffic in part of the network, leaving other network resources unused. Solving the mixed integer programming model over a range of β∈[0, 1] may yield a set of solutions that represent different tradeoffs between performance and server usage.

The mixed integer programming model may be solved multiple times for different values of β in the range [0,1] to produce a set of solutions along the efficient frontier of highest node resource utilization verses a number of servers utilized. As β increases, the solutions may favor reducing a metric associated with node utilization (e.g., decreasing the highest node resource utilization ρ) over reducing the number of nodes used. The heuristic solution may be utilized as a starting solution for a first mixed integer programming formulation, which may speed the execution of the MIP. Then for each new value of β, the preceding solution may be utilized as a starting point.

There may be extensions utilized in the mixed integer programming model. An extension may include handling a case that a subset of the service chains may be deployed. That is, less than all service chains may be accommodated by the network in some examples. In such cases, it may be desirable to produce a mapping that deploys a subset of the service chains. It may be assumed that there is a priority order among the service chains. For example, $\pi_c$ may denote the priority weight of service chain c, where a higher priority weight corresponds to a higher priority. In such examples, a new binary decision variable may be introduced: $d_c \in \{0,1\}$ indicating whether service chain c is deployed in the physical network. In such examples, the constraints expressed in Eq. 3 and Eq. 6 the right hand side may be changed to $d_c$. A new constraint may also be introduced to ensure that the service chains are deployed according to a given priority:

$$d_c \geq d_{c'} \qquad \text{(Eq. 15)}$$

for all service chains c, c'∈C for which $\pi_c > \pi_{c'}$.

In such an extension, an objective may be to deploy all service chains of a plurality of service chains to be executed in the network infrastructure is possible, and if not, to deploy as many service chains as possible according to the given priority. To that end, the solution may proceed with a slight modification. For example, the MIP (including the new decision variable and constraints described above) may first be solved with the objective of increasing $\omega' = \Sigma_c d_c$, the number of service chains deployed. The solution may then be refined by re-solving with the objective of reducing $$\omega = \beta \frac{1}{|L|} \sum_{v \in V} \sum_{l \in L} x_{v,l} + (1 - \beta)\rho,$$

while fixing the $d_c$ variables to the values obtained in the first solution.

Other extensions may be accommodated utilizing the models described herein. For example, extensions such as imposing constraints on edge bandwidth, including edge utilization when computing highest node resource utilization ρ, allowing multiple VNFs to be hosted on each server, and/or accommodating that service chain traffic flows are not split across multiple paths.

The placement engine 230 may include hardware and/or a combination of hardware and programming, but at least hardware to compute an expected latency associated with the initial VNF mapping and each of the alternate VNF mappings. For example, the placement engine 230 may include hardware and/or a combination of hardware and programming, but at least hardware to compute an expected latency of a packet entering the network infrastructure, assuming a VNF placement and service chain routing of the initial VNF mapping or a respective one of the alternate VNF mappings. The expected latency of a packet entering the network infrastructure may depend on a service chain with which the packet is associated. $E(T_c)$ may represent an expected latency of packets in a particular service chain c∈C of the probability ($\lambda_c/\Lambda$) that the packet is associated with the chain c times $E(T_c)$:

$$E(\mathcal{T}) = \sum_{c \in C} \frac{\lambda_c}{\Lambda} E(T_c). \qquad \text{(Eq. 16)}$$

The amount of time each packet takes to go through the set of services included in a service chain c may be estimated as $E(T_c)$. The latency may depend on the placement of the service chain's VNFs in the network, the nodes along the paths between successive VNFs, and the amount of traffic (for all service chains) through each of those nodes. Because the VNF placement and chain routing is defined by the initial VNF mapping and/or each alternate VNF mapping, the particular nodes, such as the particular switch or particular server in the network infrastructures, $N_c$ that packets of c will flow through may be determined by reference to the corresponding mapping. The sequence of nodes in $N_c$ may be denoted as $\{1, 2, \ldots, n_1 \ldots, |N_c|\}$ where n indicates the nth node that the packets will pass through, 1 as the source of the packets and $|N_c|$ as the final destination of the packets.

The model to estimate $E(T_c)$ may have two considerations: 1) the latency at each node n∈$N_c$, which is independent of the latency at other nodes but may be dependent on all the service chains' traffic through node n and 2) the probability that a packet may drop at any node n, which would involve a resend of the packet from the source up to node n.

Each node n may be modeled as a finite capacity, single server queue where the packets are processed one at a time while other packets wait in the queue of size $K_n-1$ for their turn to be processed on a First-In-First-Out (FIFO) policy. It may be assumed that the packets arrive according to a Poisson process with rate $\lambda_n$, a rate which reflects the traffic from all the service chains routes through node n. The time to process each packet may follow an exponential distribution $\mu_n$, and it may be assumed that $\lambda_n < \mu_n$. These assumptions may allow the utilization of the formula: M/M/1/K to estimate the expected latency $\tau_n$ of a packet at node n, including both queueing time and service time at n:

$$\tau_n = \frac{\rho_n - [1 + K_n(1-\rho_n)]\rho_n^{K_n+1}}{\lambda_n(1-\rho_n)(1-\rho_n^{K_n})} \quad \text{(Eq. 17)}$$

$$\rho_n = \frac{\lambda_n}{\mu_n}. \quad \text{(Eq. 18)}$$

Since each node n is modeled with a finite capacity queue of length $K_n-1$, packets that arrive to find the queue full may be discarded. The probability of packets dropping in this manner may be equal to the probability that there are $K_n$ packets in the system (one packet being proceed and $K_n-1$ packets in the queue). For an M/M/1/K queue, the probability of having $K_n$ packets in the network infrastructure can be expressed as:

$$P(K_n) = \frac{1-\rho_n}{1-\rho_n^{K_n+1}}\rho_n^{K_n}. \quad \text{(Eq. 19)}$$

In a software application utilizing the Transmission Control Protocol (TCP) for transferring network packets, TCP may ensure that all packets of a service chain will arrive at a destination. If any packet is dropped during transmission, TCP may resend the packets from the source until the packet reaches the destination. The expected latency computation may factor in a packet's expected queuing delay at each node included in the VNF placement as well as extra time incurred due to resent packets. $E(T_{1 \to n})$ may represent the expected latency for a packet to visit the sequence of nodes as $\{1, 2, \ldots, n\}$ in $N_c$, for $n=1, 2, \ldots, |N_c|$. Therefore, $E(T_c) = E(T_{1 \to |Nc|})$. A recursive formula for latency may be defined as follows:

$$E(T_{1 \to 1}) = \tau_1 \quad \text{(Eq. 20)}$$

$$E(T_{1 \to n}) = \tau_n + E(R_n)E(T_{1 \to n-1}) \text{ for } n=2, \ldots, |Nc| \quad \text{(Eq. 21)}$$

where $E(R_n)$ is the expected number of resends involved in transmitting the packet from node 1 to node n. To compute $E(R_n)$, $P(R_{n=m})$ may represent the probability of the packet dropping m-1 times at node n and succeeding on the mth time. Therefore, $E(R_n)$ may be derived as follows:

$$P(R_n = m) = P(K_n)^{m-1}[1 - P(K_n)] \quad \text{(Eq. 22)}$$

$$E(R_n) = \sum_{m=1}^{\infty} m \cdot P(R_n = m) \quad \text{(Eq. 23)}$$

$$= \frac{1}{1-P(K_n)}$$

(Eq. 24). Utilizing Eq. 16-Eq. 24 the expected latency $E(\mathcal{T})$ may be evaluated.

The derivation of expected latency $E(\mathcal{T})$ may offer insight into the role of node resource utilization $\rho_n$ in expected latency. Latency may increase rapidly as node resource utilization approaches one hundred percent. Moreover, the relationship between packet dropping probability $P(K_n)$ and node resource utilization $\rho_n$ may offer insight into the role of node resource utilization $\rho_n$ in preventing packets from being dropped. For example, the packet dropping probability $P(K_n)$ may increase abruptly as node resource utilization approaches one hundred percent under the same assumptions on $\lambda_n$ and $K_n$.

The placement engine 230 may include hardware and/or a combination of hardware and programming, but at least hardware to display or otherwise communicate the initial VNF mapping, the alternative mappings, and/or the expected latency associated with each to a network provider. The mappings and their corresponding expected latencies may provide a network provider with data to be utilized as part of a placement selection utility. For example, the network provider may select a placement strategy from the initial VNF mapping or alternative mappings based on a corresponding expected latency, an amount of packet loss, a node resource utilization, etc.

The selected placement engine 230 may include hardware and/or a combination of hardware and programming, but at least hardware to place the plurality of VNFs according to a selected placement strategy from the initial VNF mapping and the alternate VNF mapping. The placement may be selected by a network provider. The selection may be entered as a selection of the initial VNF mapping or the alternate VNF mappings or the selection may be performed based on thresholds determined by the network provider. Placing the VNFs according to a selected placement strategy may include instantiating VNF instances on nodes and routing service chains according to the selected mapping.

Figure 4:
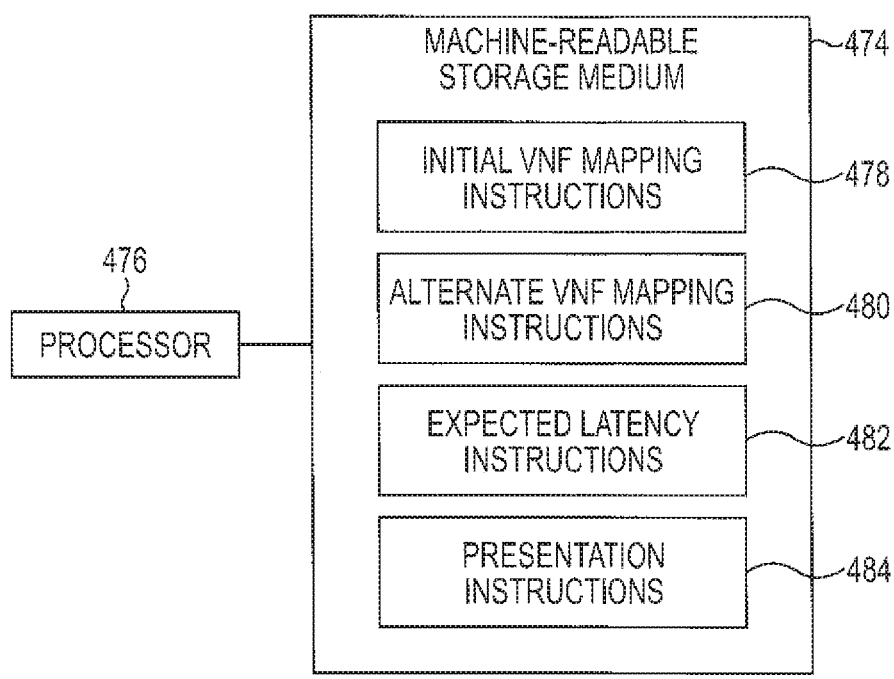
FIG. 4 illustrates a block diagram depicting an example of a machine-readable storage medium comprising instructions executable by a processor to implement an example of a system of VNF placement according to the disclosure.

FIG. 4 is a block diagram depicting an example machine-readable storage medium 474 comprising instructions executable by a processor 476 for VNF placement. In the foregoing discussion, engines 226-230 were described as combinations of hardware and programming. Engines 226-230 may be implemented in a number of fashions. Referring to FIG. 4, the programming may be processor 476 executable instructions 478, 480, 482, and 484 stored on a machine-readable storage medium 474 and the hardware may include a processor 476 for executing those instructions. Thus, machine-readable storage medium 474 may be said to store program instructions or code that, when executed by processor 476, implements a VNF placement system 220 of FIG. 2.

In FIG. 4, the executable program instructions in machine-readable storage medium 474 are depicted as initial VNF mapping instructions 478, alternate VNF mapping instructions 480, expected latency instructions 482, and presentation instructions 484. Instructions 478-484 represent program instructions that, when executed, cause processor 476 to implement engines 226-230.

Machine-readable storage medium 474 may include be any electronic, magnetic, optical, or other physical storage device that contains or stores executable instructions. In some implementations, machine-readable storage medium 474 may be a non-transitory storage medium, where the term "non-transitory" does not encompass transitory propagating signals. Machine-readable storage medium 474 may be implemented in a single device or distributed across devices.

Likewise, processor 476 may represent any number of processors capable of executing instructions stored by machine-readable storage medium 474. Processor 476 may be integrated in a single device or distributed across devices. Further, machine-readable storage medium 474 may be fully or partially integrated in the same device as processor 476, or it may be separate but accessible to that device and processor 476.

In one example, the program instructions may be part of an installation package that when installed can be executed by processor 476 to implement VNF placement system 220. In this case, machine-readable storage medium 474 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 474 may include a hard disk, optical disk, tapes, solid state drives, RAM, ROM, EEPROM, or the like.

Processor 476 may be at least one central processing unit (CPU), microprocessor, and/or other hardware device suitable for retrieval and execution of instructions stored in machine-readable storage medium 474. Processor 476 may fetch, decode, and execute program instructions 478, 480, 482, and 484, and/or other instructions. As an alternative or in addition to retrieving and executing instructions, processor 476 may include at least one electronic circuit comprising a number of electronic components for performing the functionality of at least one of instructions 478, 480, 482, and 484, and/or other instructions.

Initial VNF mapping instructions 478 may, when executed, cause processor 476 to generate an initial mapping of a plurality of VNFs. The initial VNF mapping may include a mapping of potential instantiations the plurality of VNFs among a plurality of nodes of a network infrastructure. The VNFs may be determined from a service chain workflow or a plurality of service chain workflows. The VNFs may be VNFs that are utilized to perform the actions specified in the service chain and/or set of service chains. The initial VNF mapping may include a potential placement strategy for a plurality of VNFs among a plurality of commodity servers within a telecommunications network. The initial VNF mapping may include a potential placement for each of a plurality of VNFs and, in some examples, may include a potential service chain routing strategy for a service chain or each of the plurality of service chains submitted to the network infrastructure.

The initial VNF mapping may be determined based on a heuristic. The heuristic may operate to reduce a metric associated with node resource utilization. The metric may include a highest amount of node resource utilization across the plurality of nodes being utilized to execute a service chain and/or a plurality of service chains. Reducing the metric associated with node resource utilization may include reducing the metric to a smallest amount across and/or at each of the plurality of nodes. A smallest amount of the metric may include an amount of the metric that is as small as may be achieved while still accommodating all of the traffic of a particular service chain and/or a set of service chains. Therefore, the initial VNF mapping may be determined based on a heuristic that functions to distribute service chain traffic and distribute the plurality of VNFs associated with the traffic as evenly as permissive while still accommodating all the traffic of a set of service chains. The set of service chains may include all of a plurality of service chains submitted for the network infrastructure over a given period of time or, alternatively, a portion of the plurality of service chains submitted for the network infrastructure over a given period of time, which were not dropped during the execution of the heuristic for exceeding the capacity of the nodes in the network infrastructure.

Alternate VNF mapping instructions 480 may, when executed, cause processor 476 to generate a plurality of alternate VNF mappings of a plurality of VNFs. The plurality of VNFs may include the VNFs to perform the actions specified in a service chain and/or each of a plurality of service chains to be executed through the network infrastructure. The plurality of alternate VNF mappings may include mappings of the plurality of VNFs among a portion of the plurality of nodes of the network infrastructure. The portion of the plurality of nodes of the network infrastructure may include a portion of the nodes utilized in the initial VNF mapping. For example, the alternate VNF mappings may include a potential placement strategy for a plurality of VNFs among a portion of a plurality of commodity servers within a telecommunications network utilized in the initial VNF mapping. The portion of the plurality of nodes may include all of the nodes utilized in the initial VNF mapping or the portion may include some of the nodes utilized in the initial VNF mapping. That is, the plurality of alternate VNF mappings may include potential VNF placements that differ from the initial VNF mapping in the placement of nodes and the number of nodes utilized. Additionally, the alternate VNF mappings may include additional, fewer, and or the same number of instances of VNFs having at least partially distinct placement among a portion of the nodes utilized in the initial VNF mapping.

The plurality of alternate VNF mappings may include potential placements for each of a plurality of VNFs and, in some examples, may also include a plurality of potential service chain routing strategies for a service chain and/or each of a plurality of service chains to be executed through the network infrastructure. The plurality of service chain routing strategies may differ from a routing strategy identified in the initial VNF mapping. The routing strategies may route various amounts of service chain traffic through various instances of the plurality of VNFs.

The plurality of alternate VNF mappings may be based on a mixed integer program modeling. The mixed integer program model may operate to produce a plurality of VNF placements and service chain traffic routing solutions, each of the plurality of alternate VNF mappings may correspond to a particular value of a metric associated with node resource utilization and a particular amount of nodes utilized. The initial VNF mapping may be utilized as a starting point in generating the plurality of alternate VNF mappings. For example, the particular value of a metric associated with of node resource utilization and the particular amount of nodes utilized in the initial VNF mapping may be iteratively modified to produce alternate VNF mappings at each of the iteratively modified particular amounts/values.

The mixed integer programming model may include a plurality of decision variables, a constraint, and an objective function. The decision variables may include a plurality of variables describing an assignment of instances of the VNFs to the plurality of nodes, the mapping of a service chain to a path in the network, a volume of flow for the service chain along each of the path, the rate of traffic into each node of the plurality of nodes, and a performance metric associated with each of the plurality of alternate VNF mappings. The constraint may include a linear constraint including a conservation of a flow of a service chain at each node of the plurality of nodes. For example, the constraint may include ensuring that each service chain is properly deployed, a constraint that a solution does not utilize more than the available network resource, and/or a constraint that the metrics are accurately captured. The objective function may include generating an alternate VNF mapping that reduces a weighted combination of an amount of nodes utilized to host VNFs and/or value of a metric associated with resource utilization at each of the plurality of nodes.

Expected latency instructions 482 may, when executed, cause processor 476 to generate an expected latency associated with the initial VNF mapping and each of the plurality of alternate VNF mappings. The expected latency may include the expected latency of a packet associated with a service chain entering the network and being routed through VNFs placed in nodes of the network infrastructure. The latency may include the amount of time that each packet takes to go through the set of services requested in a service chain. The latency may depend on which service chain the packet is associated with. The latency may also depend on the placement of a service chain's VNFs in the network, the nodes utilized along the paths between successive VNFs, and the amount of traffic (for all service chains submitted for execution via a the network infrastructure) through each of the nodes of the network infrastructure. A model may be utilized to estimate the latency. The model may utilize two considerations, among other possibilities. For example, the model may be based on a consideration of the latency at each particular node which is independent of the latency at other nodes but is dependent on all service chains' traffic through a particular node and the probability that a packet may drop at any node triggering a resend of the packet from the source up to the node.

Presentation instructions 484 may, when executed, cause processor 476 to present the results of the mappings and the associated expected latencies. For example, the instructions may include instructions to present the initial VNF mapping, an expected latency associated with the initial VNF mapping, at least one of the plurality of alternate VNF mappings, and/or the expected latency associated with the at least one of the plurality of alternate VNF mappings. In an example, the at least one of the plurality of alternate VNF mappings and their associated expected latency may include a portion of the plurality of alternate VNF mappings and their associated expected latencies. In an example, the portion may include a single alternate VNF mapping and associated latency. The single alternate VNF mapping and associated expected latency may be an alternate VNF mapping that achieves a greatest decrease in the highest node resource utilization and a greatest decrease in the amount of nodes utilized in the mapping while still accommodating the traffic of a plurality of service chains through the network infrastructure at a lowest latency. The results of the mappings and the associated expected latencies may be presented to a network provider. For example, the mappings and the associated expected latencies may be presented via a user interface to a network administrator. The mappings and the associated expected latencies may be presented as part of a selectable interface accommodating the selection of a particular mapping strategy chosen from the initial VNF mapping and/or the plurality of alternate VNF mappings. The selected mapping may then be implemented. Implementation may include instantiating VNF instances at nodes indicated in the selected mapping and routing service chain traffic according to the selected mapping.

Figure 5:
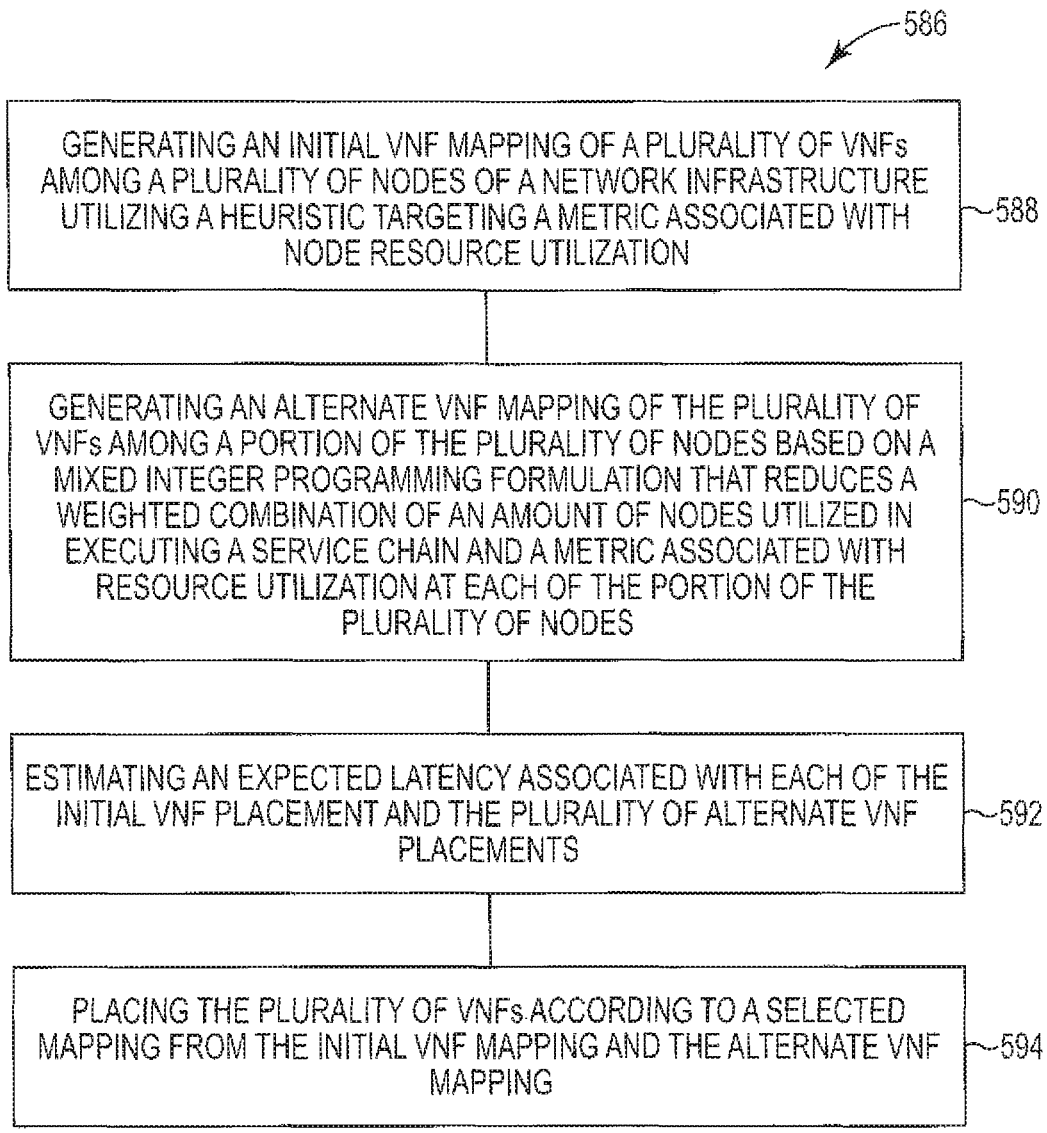
FIG. 5 illustrates a flow diagram depicting an example of a method of VNF placement according to the disclosure.

FIG. 5 is a flow diagram depicting an example of a method 486 for VNF placement. The various processing blocks and/or data flows depicted in FIG. 5 are described in greater detail herein. The described processing blocks may be accomplished using some or all of the system components described in detail above and, in some implementation, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 586 as illustrated (and described in greater detail below) is meant to be an example and, as such, should not be viewed as limiting. Method 486 may be implemented in the form of executable instructions stored on a machine-readable storage medium (e.g., machine-readable storage medium 474, previously described in connection with FIG. 4), and/or in the form of electronic circuitry.

As illustrated at 588, the method 586 may include generating an initial VNF mapping of a plurality of VNFs among a plurality of nodes of a network infrastructure. The initial VNF mapping may be based on a heuristic. The heuristic may target a metric associated with node resource utilization. For example, the heuristic may target a reduction of a highest node resource utilization across the plurality of nodes utilized in placing the VNFs. In an example, the heuristic may reduce the value of a metric associated with node resource utilization of each node of a plurality of nodes utilized in placing VNFs.

As illustrated at 590, the method 586 may include generating an alternate VNF mapping of the plurality of VNFs among a portion of the plurality of nodes. The alternate VNF mapping of the VNFs may be based on a mixed integer programming model. The mixed integer programming model may reduce a weighted combination of an amount of nodes utilized in executing a service chain and a value of a metric associated with node resource utilization at each of the portion of the plurality of nodes. Generating the alternate VNF mapping may include generating an additional alternate VNF mapping of the plurality of VNFs among a second portion of the plurality of nodes based on the mixed integer formulation that reduces a second differently weighted combination of the amount of nodes utilized in executing the service chain and the metric associated with resource utilization at each of the second portion of the plurality of nodes.

As illustrated at 592, the method 586 may include estimating expected latencies associated with the initial VNF mapping and the alternative mapping. For example, an expected latency of a packet traversing the network infrastructure having VNFs placed at the nodes indicated in the initial or alternative VNF mapping in a route specified in the initial or alternative VNF mapping may be calculated. The expected latency may be based on latency at each of the plurality of nodes considering all service chain traffic through each of the plurality of nodes. The expected latency may be based on a probability that a packet will be dropped at each node triggering a resend of the packet from the source.

As illustrated at 594, the method 586 may include placing the plurality of VNFs at a plurality of nodes of the network infrastructure. The placement of the VNFs may be accomplished by instantiating instances of VNFs across various nodes according to a selected initial VNF mapping and/or a selected alternate VNF mapping. Additionally, the service chain traffic associated with the VNFs may be routed through the network infrastructure according to a selected initial VNF mapping and/or a selected alternate VNF mapping.

Figure 6:
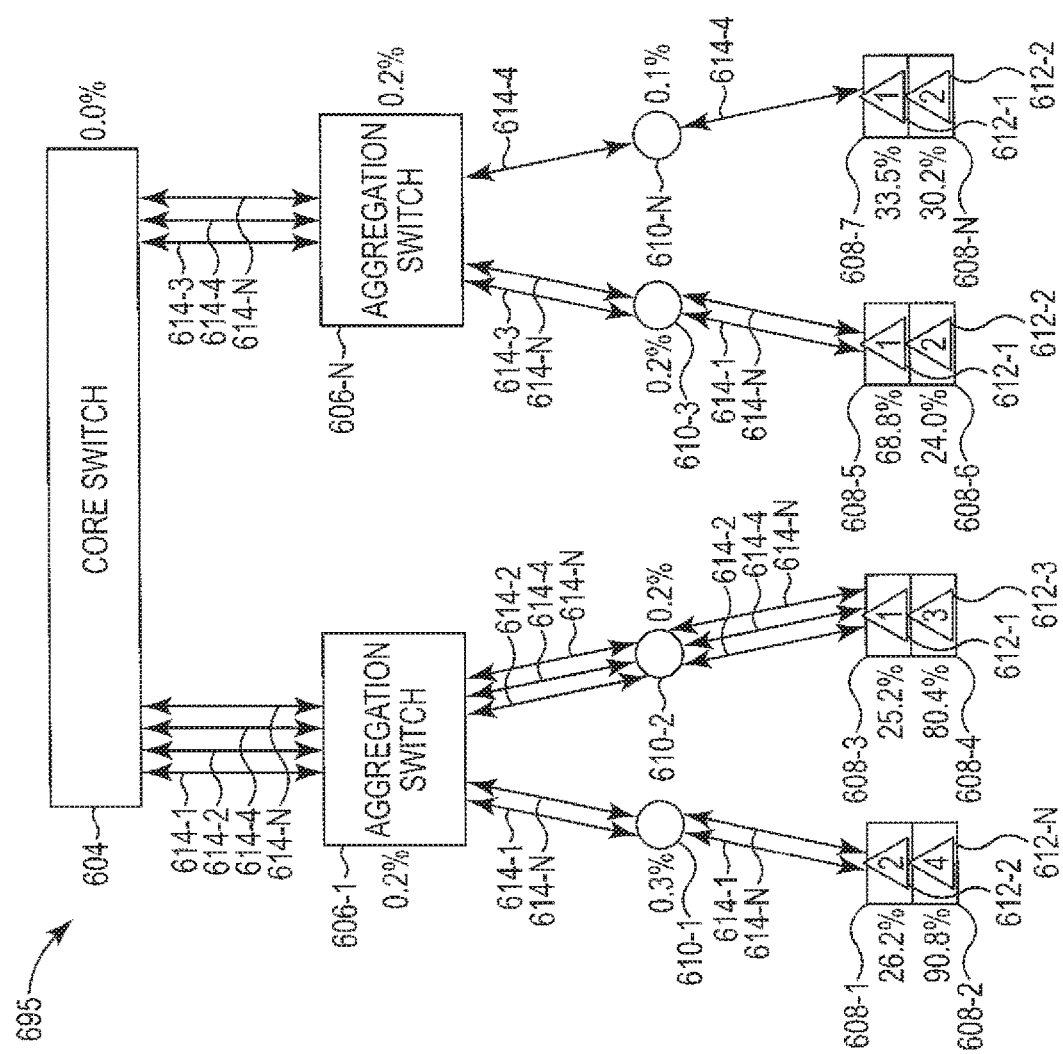
FIG. 6 illustrates an example of a heuristic VNF placement solution according to the disclosure.
Figure 7:
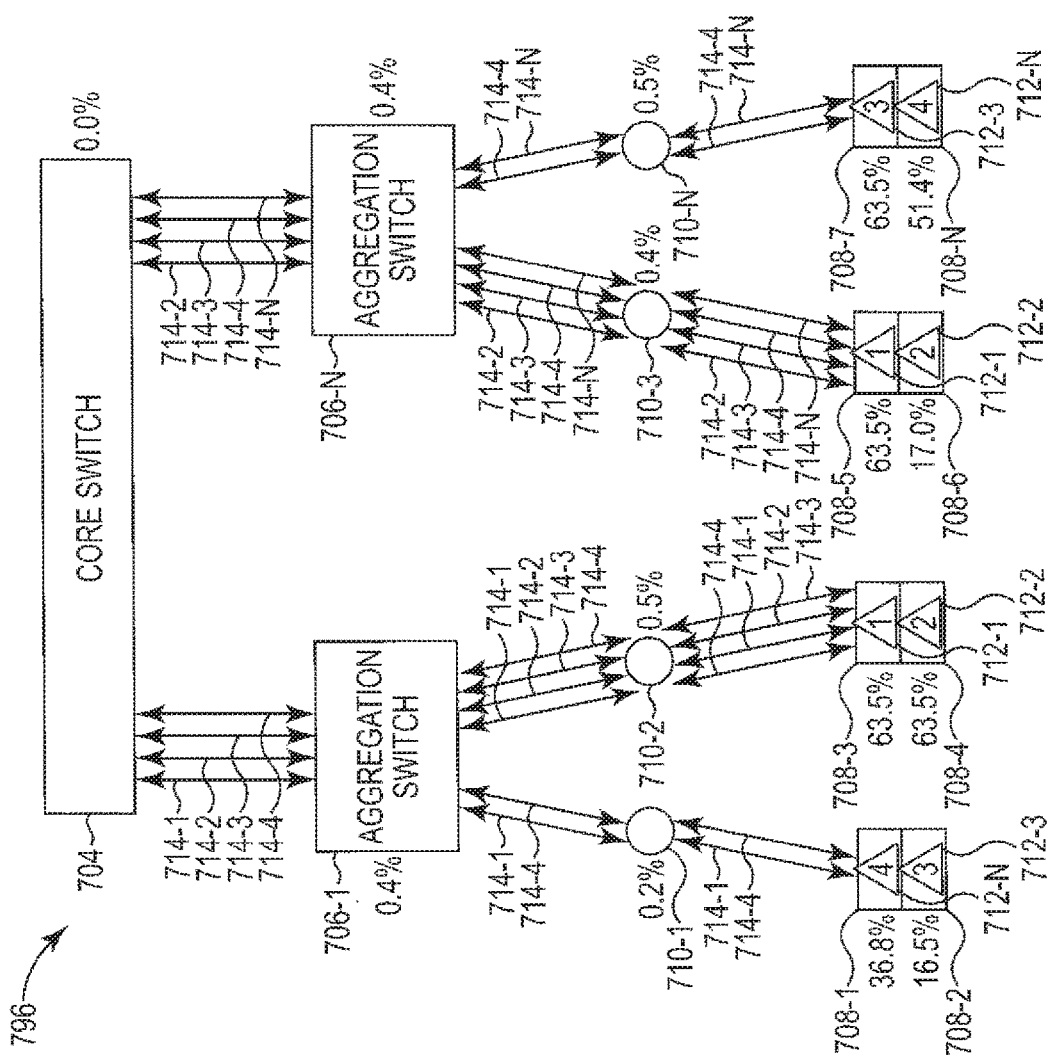
FIG. 7 illustrates an example of a mixed integer programming VNF placement solution according to the disclosure.
Figure 8:
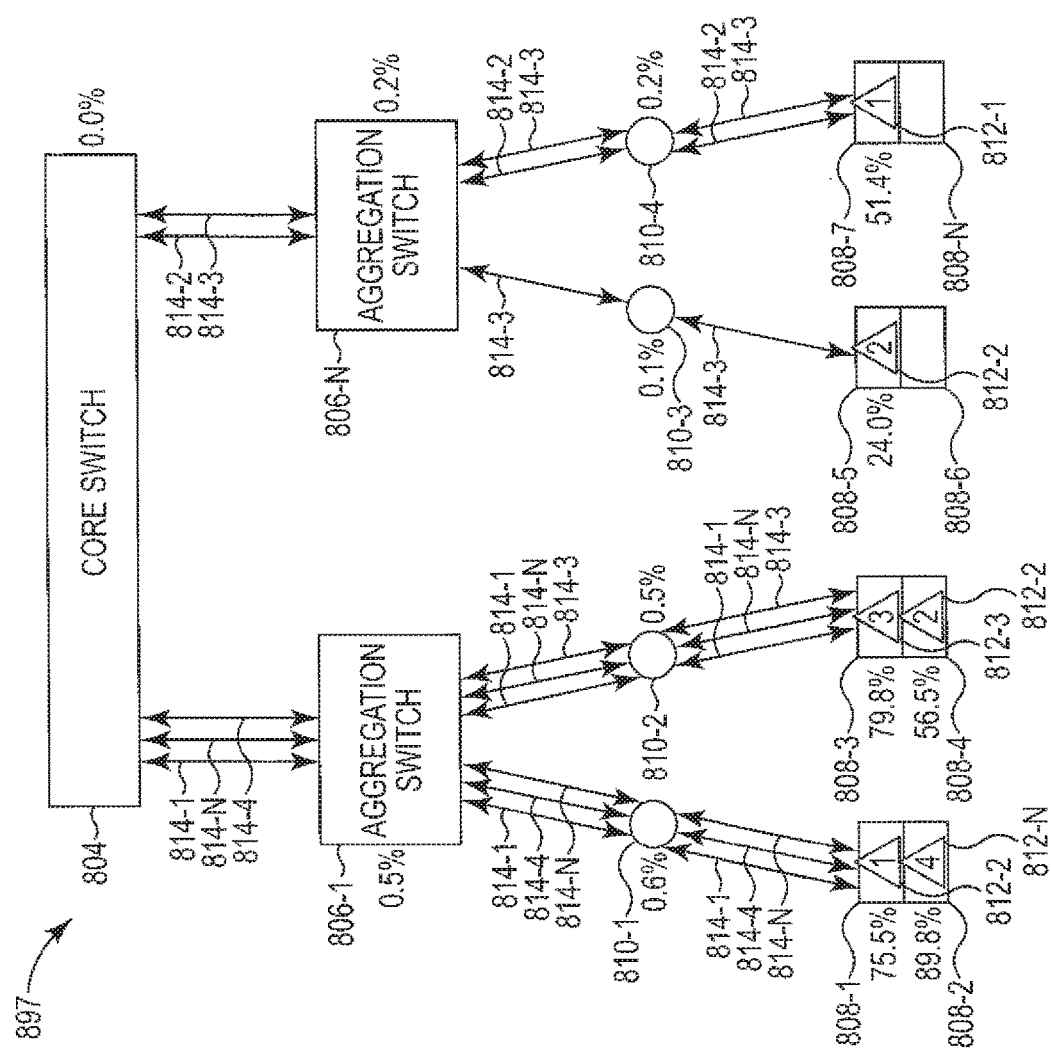
FIG. 8 illustrates an example of a second mixed integer programming VNF placement solution according to the disclosure.

FIGS. 6, 7, and 8 illustrate examples of VNF placement solutions 695, 796, and 897 to the example VNF placement scenario 100 of FIG. 1. The VNF placement solutions 695, 796, and 897 may be generated utilizing the system 220 described in FIG. 2, the machine readable storage medium 474 described in FIG. 4, and/or the method 586 described in FIG. 5. The VNF placement solutions 695, 796, and 897 and their associated metrics may be presented to the network provider. With this information, the network provider may choose the solution that strikes a threshold tradeoff between expected latency and a number of servers used. The selected solution may then be implemented.

Heuristic solution 695 illustrated in FIG. 6 may include an initial VNF mapping generated utilizing the above described heuristic model. The heuristic model may import information about the physical topology of the network infrastructure, the VNFs, and the service chains. The heuristic solution 695 may employ all eight servers 608-1 . . . 608-N of the network infrastructure to host the plurality of VNFs 612-1 . . . 612-N. The route of each service chain 614-1 . . . 614-N may be included in the heuristic solution 695. The percentage of computational resource usage at each switch (e.g., core switch 604 and aggregation switched 606-1 . . . 606-N) and each server 610-1 . . . 610-N is indicated next to each of the nodes. The server with the highest computational resource utilization is approximately ninety-one percent at VNF 612-N.

After the heuristic solution 695 is generated, the heuristic solution 695 may be passed on along with its input data to a mixed integer programming model as discussed above. The mixed integer programming model may be solved for a series of values $\beta$. A mixed integer programming model may utilize the heuristic solution 695 as a starting point for its first run, and it may utilize each solution for a subsequent run of the mixed integer programming model, thereby reducing solution time.

Mixed integer programming solution 796 depicted in FIG. 7 may depict a mixed integer programming solution 796 for $\beta=0$, for which the objective constitutes reducing node resource utilization over all the switches (e.g., core switch 704 and aggregation switched 706-1 . . . 706-N) and VNFs 712-1 . . . 712-N. Mixed integer programming solution 796 may utilize all eight servers 710-1 . . . 710-N to host the VNFs 712-1 . . . 712-N. The service chains 714-1 . . . 714-N may be split across multiple paths in the network infrastructure, in order to distribute traffic evenly. The highest computational resource usage over the network infrastructure is approximately sixty-three percent.

A second mixed integer programming solution 897 illustrated in FIG. 8 may depict a second mixed integer programming solution 897 for $\beta=0.2$. The second mixed integer programming solution 897 may utilize six servers 808-1-808-5 and 808-7 to host the VNFs 812-1 . . . 812-N. The use of six servers 808-1-808-5 and 808-7 may reflect an objective function's higher penalty on the total number of nodes utilized in the solution. The highest computational resource usage over the network infrastructure increases from the mixed integer programming solution 796 to approximately ninety percent reflecting its reduced priority in the objective function.

The average expected latency may be computed for each of the heuristic solution 695, the mixed integer programming solution 796, and the second mixed integer programming solution 897 utilizing the expected latency models described above. For example, the heuristic solution 695 may have an average expected latency of 0.123 seconds, the mixed integer programming solution 796 may have an average expected latency of 0.066 seconds, and the second mixed integer programming solution 897 may have an average expected latency of 0.135 seconds.

At least one of the heuristic solution 695, the mixed integer programming solution 796, and the second mixed integer programming solution 897 and their associated metrics, such as average expected latency, may be presented to the network provider. The network provider may select a mapping corresponding to the heuristic solution 695, the mixed integer programming solution 796, or the second mixed integer programming solution 897 and that mapping may be implemented.

The foregoing disclosure describes a number of example implementations for VNF placement. The disclosed examples may include systems, devices, computer-readable storage media, and methods for VNF placement. For purposes of explanation, certain examples are described with reference to the components illustrated in FIGS. 1-8. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 5 is an example and is not intended to be limiting. Additional or fewer operations or combinations of operations may be used or may vary without departing from the scope of the disclosed examples. Furthermore, implementations consistent with the disclosed examples are not specified in a manner to indicate that they are performed in a particular order. Thus, the present disclosure merely sets forth possible examples of implementations, and many variations and modifications may be made to the described examples. All such modifications and variations are intended to be included within the scope of this disclosure and protected by the following claims.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 110 can refer to element "10" in FIG. 1 and an analogous element can be identified by reference numeral 210 in FIG. 2.

Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", particularly with respect to reference numerals in the drawings, indicate that a number of the particular feature so designated can be included with examples of the present disclosure. The designators can represent the same or different numbers of the particular features. Further, as used herein, "a" element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A virtualized network function (VNF) placement system, comprising:
    a heuristic mapping engine to generate an initial mapping of a plurality of VNFs among a plurality of nodes of a network infrastructure, wherein the initial VNF mapping distributes each of a plurality of service chains associated with the plurality of VNFs to different top-of-rack switches, wherein each of the plurality of service chains is assigned a priority;
    a mixed integer mapping engine to generate an alternate VNF mapping of the plurality of VNFs among a portion of the plurality of nodes, wherein the alternate VNF mapping corresponds to a particular value of a metric associated with node resource utilization and a particular amount of servers utilized by distributing the plurality of service chains according to the alternate VNF mapping; and
    a selected placement engine to place the plurality of VNFs according to a selected placement from the initial VNF mapping and the alternate VNF mapping based on estimates of expected latency associated with the initial VNF mapping and the alternate VNF mapping.

2. The system of claim 1, further comprising the heuristic mapping engine to identify a route for each of the plurality of service chains over a portion of the plurality of nodes of the network infrastructure according to a corresponding service chain specification.

3. The system of claim 1, further comprising the selected placement engine to present, to a network provider, the initial VNF mapping, the alternate VNF mapping, an expected latency of a service chain packet associated with the initial VNF mapping, and an expected latency of a service chain packet associated with the alternate VNF mapping.

4. The system of claim 1, wherein the initial VNF mapping spawns a new instance of a particular VNF of the plurality of VNFs on a spare capacity of a particular node of the plurality of nodes when the particular node does not already host the particular VNF.

5. The system of claim 1, wherein the initial VNF mapping spawns a plurality of instances of a particular VNF across a plurality of nodes if a particular instance of the particular VNF on a particular node has insufficient capacity to host a corresponding portion of the plurality of service chains.

6. The system of claim 1, wherein one or more VNFs of the plurality of VNFs are non-static.

7. The system of claim 1, wherein functions performed by the plurality of VNFs include running a virtual machine utilizing at least a portion of a network node.

8. A non-transitory computer-readable medium containing instructions executable by a processor to cause the processor to:
    generate an initial VNF mapping of a plurality of virtualized network functions (VNFs) among a plurality of nodes of a network infrastructure, wherein the initial VNF mapping is based on a metric associated with node resource utilization, and the plurality of VNFs constitute a plurality of service chains, each service chain being assigned a priority;
    generate a plurality of alternate VNF mappings of the plurality of VNFs among a portion of the plurality of nodes using a mixed integer programming formulation, wherein the each of the plurality of alternative mappings corresponds to a particular value of the metric associated with node resource utilization and a particular amount of nodes utilized;
    generate an expected latency associated with each of the initial VNF mapping and the plurality of alternate VNF mappings; and
    present the initial AVNF mapping, the expected latency associated with the initial VNF mapping, an alternate VNF mapping, and the expected latency associated with the alternate VNF mapping to a network provider for selection.

9. The medium of claim 8, wherein the initial VNF mapping is a starting point in generating the plurality of alternate VNF mappings.

10. The medium of claim 8, wherein each of the plurality of alternate VNF mappings is based on a mixed integer programming model including a plurality of decision variables, a linear constraint, and an objective function.

11. The medium of claim 10, wherein the plurality of decision variables include variables describing an assignment of instances of the VNFs to the plurality of nodes, the mapping of a service chain to a path in the network, a volume of flow for the service chain along each of the path, the rate of traffic into each node of the plurality of nodes, and a performance metric associated with each of the plurality of alternate VNF mappings.

12. The non-transitory computer-readable medium of claim 10, wherein the linear constraint includes a conservation of a flow of a service chain at each node of the plurality of nodes.

13. The non-transitory computer-readable medium of claim 10, wherein the objective function includes generating an alternate VNF mapping that reduces a weighted combination of an amount of nodes utilized and an amount of utilization at each of the plurality of nodes.

14. The medium of claim 8, further containing instructions executable by the processor to cause the processor to:
    generate a user interface to allow selection of a VNF mapping of the plurality of VNFs.

15. A method of virtualized network function (VNF) placement, comprising:
    generating an initial VNF mapping of a plurality of VNFs among a plurality of nodes of a network infrastructure utilizing a heuristic targeting a metric associated with node resource utilization, wherein the plurality of VNFs constitute a plurality of service chains, each service chain being assigned a priority;
    generating an alternate VNF mapping of the plurality of VNFs among a portion of the plurality of nodes based on a mixed integer programming formulation that reduces a weighted combination of an amount of nodes utilized in executing a service chain and a metric associated with resource utilization at each of the portion of the plurality of nodes;
    estimating an expected latency associated with each of the initial VNF placement and the plurality of alternate VNF placements; and placing the plurality of VNFs according to a selected mapping from the initial VNF mapping and the alternate VNF mapping.

16. The method of claim 15, comprising estimating the expected latency based on a VNF mapping at each of the plurality of nodes considering service chain traffic through each of the plurality of nodes.

17. The method of claim 16, comprising estimating the expected latency based on a probability that a packet will drop at each node triggering a resend of the packet from the source.

18. The method of claim 15, comprising generating an additional alternate VNF mapping of the plurality of VNFs among a second portion of the plurality of nodes based on the mixed integer formulation that reduces a second differently weighted combination of the amount of nodes utilized in executing the service chain and the metric associated with resource utilization at each of the second portion of the plurality of nodes.

19. The method of claim 15, wherein the initial VNF mapping is generated based on heterogeneous servers having various levels of efficiency in the network infrastructure.

20. The method of claim 15, wherein each service chain is assigned a priority such that the initial VNF mapping or the alternative VNF mapping includes designated routes for network traffic from a subset of the service chains having a highest priority.

* * * * *